«12» United States Patent
Poddar et al.

(10) Patent No.: US 11,809,436 B2
(45) Date of Patent: Nov. 7, 2023

(54) SOURCE CODE SEARCH ENGINE

(71) Applicant: Microsoft Technology Licensing LLC., Redmond, WA (US)

(72) Inventors: Shruti Poddar, Hyperabad (IN); Neeraj Makam, Hyperabad (IN)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 0 days.

(21) Appl. No.: 17/515,381

(22) Filed: Oct. 29, 2021

(65) Prior Publication Data
US 2022/0050850 A1    Feb. 17, 2022

Related U.S. Application Data

(63) Continuation of application No. 15/268,080, filed on Sep. 16, 2016, now Pat. No. 11,176,144.

(51) Int. Cl.
*G06F 16/24* (2019.01)
*G06F 16/2457* (2019.01)
*G06F 8/36* (2018.01)

(52) U.S. Cl.
CPC .......... *G06F 16/24578* (2019.01); *G06F 8/36* (2013.01)

(58) Field of Classification Search
CPC ......... G06F 16/24578; G06F 8/36; G06F 8/30
See application file for complete search history.

(56) References Cited

U.S. PATENT DOCUMENTS

| | | | | |
|---|---|---|---|---|
| 8,566,789 B2* | 10/2013 | Siddaramappa | ........ | G06F 16/80 707/765 |
| 8,589,411 B1* | 11/2013 | Sung | ......................... | G06F 8/33 707/804 |
| 8,621,424 B2* | 12/2013 | Kejariwal | ........... | G06F 9/30072 717/106 |
| 8,688,676 B2* | 4/2014 | Rush | ......................... | G06F 8/36 707/706 |
| 9,003,366 B2* | 4/2015 | Zeidman | ................... | G06F 8/73 726/32 |
| 9,378,242 B1* | 6/2016 | Fontenot | ................. | G06F 8/427 |
| 2007/0299825 A1* | 12/2007 | Rush | ....................... | G06Q 10/10 |
| 2010/0325614 A1* | 12/2010 | Zeidman | ................... | G06F 8/73 717/123 |
| 2012/0254161 A1* | 10/2012 | Zhang | ............... | G06F 16/24578 707/723 |

* cited by examiner

*Primary Examiner* — Kris E Mackes
*Assistant Examiner* — Cecile H Vo

(57) ABSTRACT

A syntax-based ranking technique is provided that ranks search results from multiple source code files in an order that considers the relevance of each matched term with a corresponding code type and the relevance of the type of file that contains the matched term. Boost values are provided for each code type of a matched term in order to weigh certain occurrences of the matched term with more relevance. Boost values are provided for each type of file that contains the matched term in order to weigh the occurrence of the term in a particular file with more relevance.

14 Claims, 6 Drawing Sheets

FIG. 4

Search for

Code

Search in

Projects
- [X] Roslyn
- [ ] Accounts
- [ ] TestProj

Showing 4 out of 35 results

Roslyn>Roslyn>Documentation    5 matches
\src\Compilers\Core\Portable\InternalUtilities\Document.cs

Roslyn>Roslyn>SyntaxFactory.cs    34 matches
\src\Compilers\Core\Portable\Syntax\SyntaxFactory.cs

Roslyn>Roslyn>SyntaxHelpers.cs    8 matches
\src\ExpressionEvaluator\CSharp\Source\SyntaxHelpers.cs

Roslyn>Roslyn>CommandLineText.cs    5 matches
\src\Compilers\CSharp\Test\CommandLine\CommandLineText.cs

PARSER

```
510
511  }
512  private static class Parser
513  {
514  public static Bool SymbolId(string Id)
515  {
516    if (id == null)
516    {
517      return false;
518    }
519    if (id.Length < 2)
520    {
522      return false;
523    }
524    int index = 0;
525    results.Clear();
526    ParseDeclaredId(id, ref index, compilation, results);
527    return results.Count != 0;
528  }
```

SOURCE CODE SEARCH ENGINE

CROSS-REFERENCE TO RELATED APPLICATION

This is a continuation of application Ser. No. 15/268,080 filed on Sep. 16, 2016, entitled "SOURCE CODE SEARCH ENGINE", the entirety of which is incorporated by reference.

BACKGROUND

Software developers often search for snippets of source code in a source code repository for a variety of reasons. A search may be for a particular source code implementation to reuse in another project, to learn about the usage of the source code, to find source code written by colleagues working on the same project, and so forth. Often at times, the search results are unsorted thereby making the task of navigating through the search results difficult and frustrating for a developer.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The search for a snippet of code in a source code repository generates search results containing the matched terms of a search query from multiple files in an order that is based on each file's rank score. Each file in which the term occurs is given a rank score. The rank score is based on the code type of each matched occurrence of a term weighted by a boost value for the code type. A code type is a designation or classification of the usage of the matched term in the file that is relative to the contextual meaning of the term as that meaning relates to the programming language of the source code. The rank score for each file is weighted by a boost value corresponding to its file type. The rank score for each file is then used to order the search results in an order of descending rank score.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF DRAWINGS

FIG. 4 is an exemplary illustration of a user interface for displaying the ranked search results.

DETAILED DESCRIPTION

Overview

Programmers (i.e., developers, users, end users, etc.) search source code repositories to find snippets of source code for a variety of reasons. A programmer may search source code for examples of the usage of an application programming interface (API), to find source code written by colleagues working on a same project, to find all the places a particular function is called, to reuse the source code, to learn from existing source code implementations, or to perform debugging, refactoring and maintenance tasks.

The search results may be unsorted or ranked in accordance with some measure of relevancy. Often a ranking function is used to sort the results in an order that is based on the frequency that the keywords in a search query appear in a file. Such frequency-based ranking techniques are useful for natural language documents where the documents do not conform to a particular syntactical structure. However, such frequency-based ranking techniques are not useful for source code which is structured in accordance to the grammar of a programming language. The frequency of the keywords appearing in an unstructured document often produces results that are less relevant to the search query.

The subject matter disclosed herein overcomes the shortcomings in the prior solutions by considering the relevance of the usage of a term of a search query in the source code file and the relevance of the type of file where the term is found. The relevance of the term is based on how the term is used in the context of the source code which is based on the underlying programming language. The consideration of these two factors, term usage and file type, produces a syntax-based ranking order that outputs the search results in a more meaningful and relevant manner.

Source Code Search Engine

Figure 1:
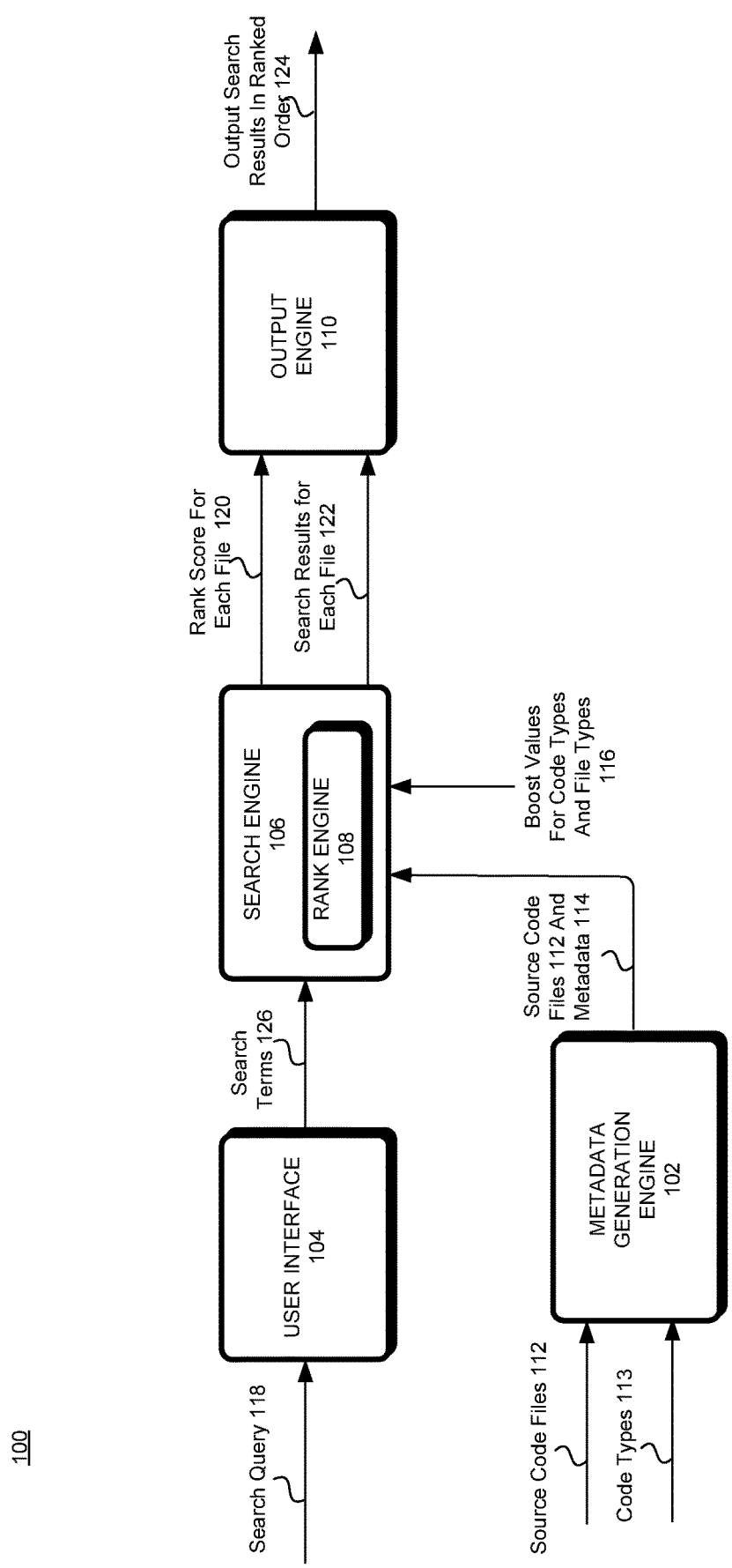
FIG. 1 is a block diagram illustrating the various components of a system for ranking search results.

Attention now turns to FIG. 1 for a description of an exemplary configuration of a system 100 for ranking search results. In one aspect of the subject matter disclosed herein, the system 100 includes a metadata generation engine 102, a user interface 104, a search engine 106, a rank engine 108, and an output engine 110. The metadata generation engine 102 receives one or more source code files 112 and code types 113 for a particular programming language and generates metadata 114 for each source code file 112. In one aspect, the metadata 114 identifies a location where each word in a source code file 112 is located and associates a code type for each word. The code type 113 classifies a word with its usage in the source code file that is relative to the syntax of the programming language of the source code file 112. The metadata 114 may be included in the source code file or in a separate file from the source code file. In essence, the metadata 114 is an index to each word in the source code file. The metadata 114 includes each word and the location in the source code file for each occurrence of the word along with its corresponding code type at that location.

The user interface 104 accepts a search query 118 which can include one or more terms. The search query 118 can be expressed in any number of formats. For example, a search query 118 can be composed in at least one of the following formats: (1) single term, such as "QueueJobsNow"; (2) multiple terms, such as "QueueJobsNow Framework", where "QueueJobsNow" and "Framework" are terms; (3) an expression that includes one or more Boolean operators (e.g., AND, OR, NOT, and AND NOT), such as "QueueJobsNow OR Framework"; (4) with one or more wildcard characters, such as "QueueJobs*", where * is the wildcard character; (5) with code type filters, such as "Method: QueueJobsNow", where "Method:" indicates that matches having "QueueJobsNow" as a Method are to be found; and (6) as phrases, such as "QueueJobsNow initiate" which indicates that the term "QueueJobsNow" is used to initiate an action.

The search terms 126 of the search query 118 are input to a search engine 106 which performs the intended search on each of the requested source code files 112. The search engine 106 includes a rank engine 108 which ranks the search results from each of the searched source code files in accordance with a ranking technique that sorts the search results in a relevant order. The search engine 106 receives the source code files to be searched 112 and the metadata 114.

A code type 113 is a description of a word in the source code file that is based on the context of the word in the source code which is relative to the syntax of the programming language of the source code. For example, the code types for source code written in the C #programming language may include the following: argument; basetype; caller; class; class declaration; class definition; comment; constructor; declaration; definition; destructor; enumerator; extern; field; friend; function; function declaration; function definition; global; header; interface; macro; macro definition; macro reference; method; method declaration; method definition; namespace; property; reference; string literal; struct; struct declaration; struct definition; template argument; template spec; type; typedef; and union. Each of these code types classifies a word that is used in the source code with a classification or type that is based on the grammar of the C #programming language. By associating a code type with each word in the source code file, weights can be assigned to each code type in order to attribute a relevance to a matched term when used in a certain context.

In addition, the search engine 106 receives the boost values for each code type and file type 116. A boost value for a code type is a factor that is used to weigh the occurrence of term with a certain degree of relevance when the term is used in a particular context. A boost value for a file type is a factor that is used to weigh the type of a file with a certain degree of relevance. In one aspect, the boost values are pre-configured values. Alternatively, the boost values may be user-defined values that are input to the search engine or selected from pre-configured values based on an objective of the search. For example, if the search is being performed to search for the declaration of a variable, then the boost values for the code types of declaration and definition may contain higher values. In this manner, the search results where the term is used in the context of a declaration and definition is ranked higher than when used in other contexts.

The output engine 110 displays the search results in accordance with the rank scores 124 generated by the ranking engine. The search results 122 may be displayed in any format and on any type of device (e.g., printer, display, etc). For example, the search results may be displayed in a source code editor along with the searched source code files, in a user interface associated with the search engine, in an integrated development environment, or in a listing on a display.

Attention now turns to a description of the operations for the aspects of the subject matter described with reference to various exemplary methods. It may be appreciated that the representative methods do not necessarily have to be executed in the order presented, or in any particular order, unless otherwise indicated. The exemplary methods may be representative of some or all of the operations executed by one or more aspects described herein and that the method can include more or less operations than that which is described. Moreover, various activities described with respect to the methods can be executed in serial or parallel fashion, or any combination of serial and parallel operations. The methods can be implemented using one or more hardware elements and/or software elements of the described embodiments or alternative embodiments as desired for a given set of design and performance constraints.

Figure 2:
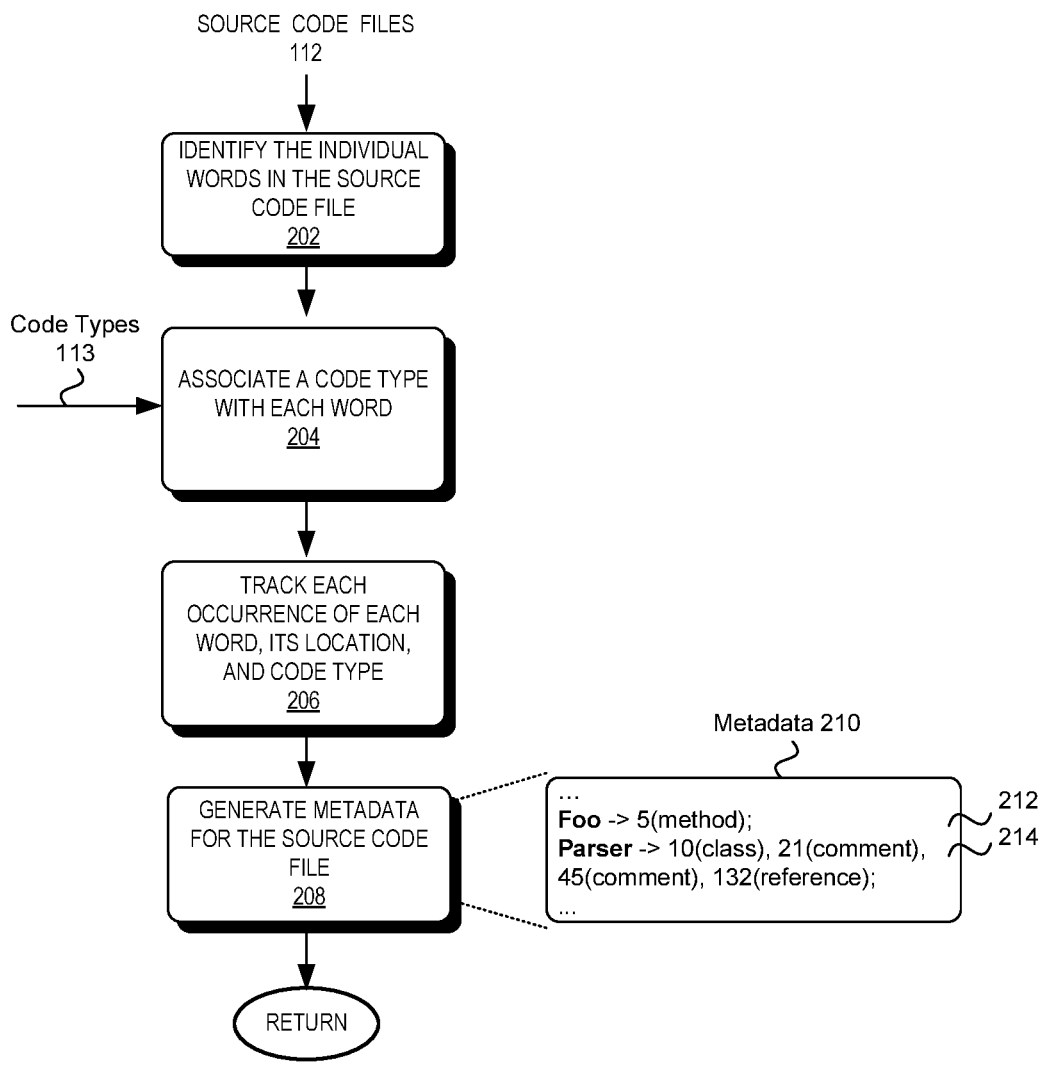
FIG. 2 is a flow diagram of an exemplary method for generating the metadata.

FIG. 2 illustrates a flow diagram of an exemplary method 200 of the metadata generation engine 102 in generating the metadata of a source code file. In one aspect of the subject matter, the metadata generation engine 102 may scan each line in the source code file and parse the string of characters in each line to identify each word in the line (block 202). Each word is associated with a code type by using the grammar of the programming language of the source code to identify the element of the grammar that the word is associated with. The metadata generation engine 102 associates an identified grammatical element with a corresponding code type (block 204). The metadata generation engine 102 tracks the location of each occurrence of a word with its associated code type (block 206) which is output as metadata for the source code file (block 208).

An exemplary metadata listing is shown in block 210. Block 210 shows the metadata having two words "Foo" and "Parser." Line 212 recites "Foo-5 (method);" which represents that the word "Foo" is located at line 5 in the source code file and is associated with a code type of "Method." Line 214 recites "Parser→10 (class), 21 (comment), 45 (comment), 132 (reference);" which represents that the word "Parser" is found in four different locations in the source code as follows: (1) at line 10 and associated with the code type "class"; (2) at line 21 and associated with the code type "comment"; (3) at line 45 and associated with the code type "comment"; and (4) at line 132 and associated with the code type "reference."

Figure 3:
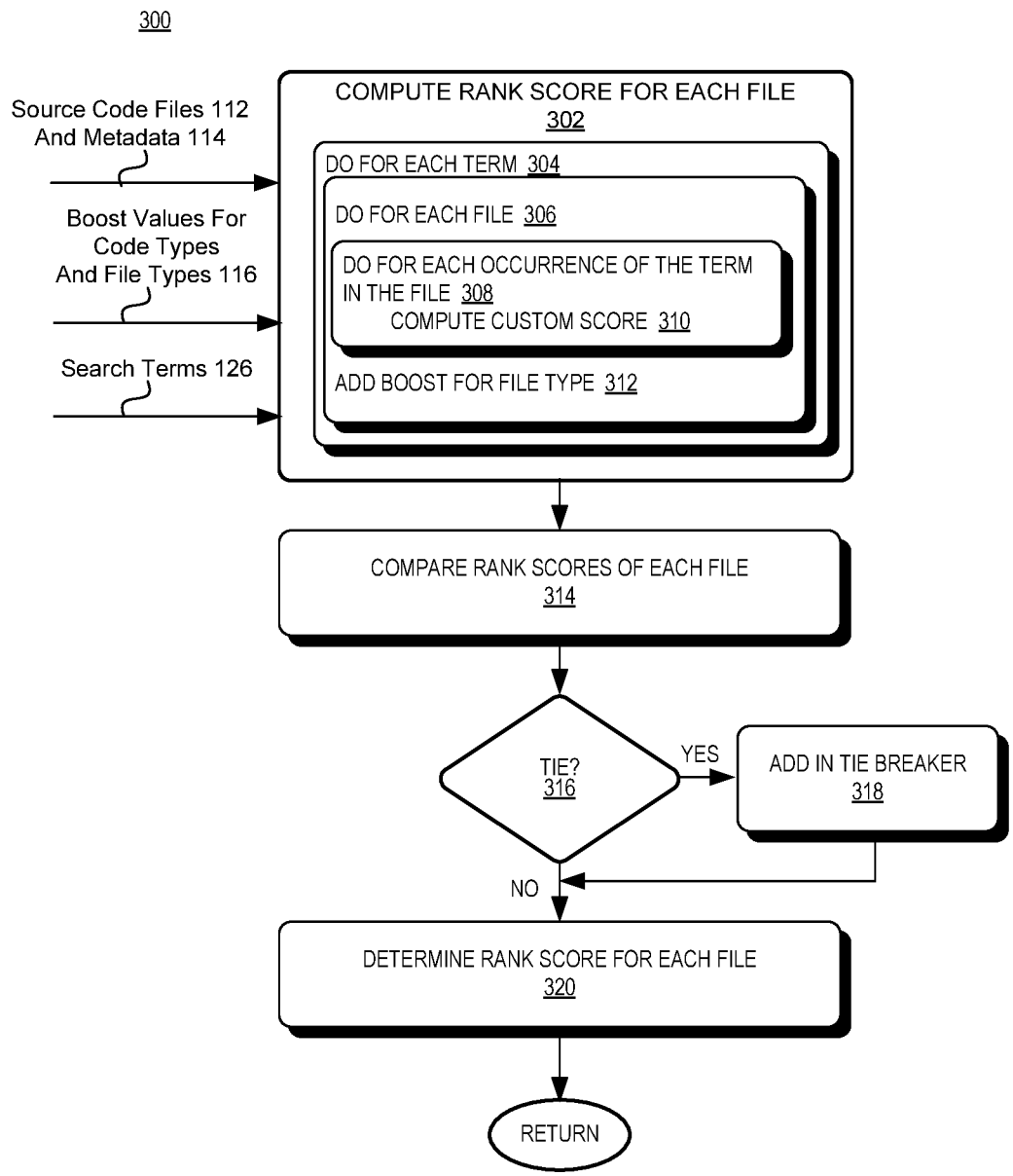
FIG. 3 is a flow diagram of an exemplary method for determining a ranking order for search results.

Attention now turns to FIG. 3 which illustrates a flow diagram of an exemplary method 300 of the rank engine 108. The rank engine 108 determines a ranked order of the search results based on a rank score for each of the searched source code files. The rank score is composed of a custom score, a term score for each matched term, a boost value for the code type of each matched term, and a boost value for the file type. The rank score for each file may be represented mathematically as follows:

Rank Score=Custom Score*Boost Value for the File Type, where the Custom Score=$\Sigma_{i=1}^{n}$ Term Score ($t_i$),
t=term in the search query,
i=code type for term t,
n=number of code types for term t,
Term Score ($t_i$)=Boost value for code type i*(#of occurrences that term t occurs as code type i).

The code type i associated with each term t, in a given search query, is given a term score, Term Score ($t_i$), that is boosted by a boost value for that particular code type. The sum of all the Term Scores for a particular term is considered the Custom Score. The Custom Score is then boosted by a boost value for the file type resulting in the Rank Score for the file.

The computation of the rank score in this manner takes into consideration the relevance of the context in which the term is found and the relevance of the type of file where the term is found. The boost values are tailored to weigh the context in which a term appears and the file types in which the terms appear more heavily in order to meet a particular search objective. Boost values can be user-defined for a particular objective or selected from pre-configured values.

For example, when a programmer is searching for the implementation of an API call, the boost values for the function, function declaration, function definition, and call code types would have a higher weight or boost value since words associated with these code types are more likely to be associated with an API call. Likewise, the boost values for certain file types, such as files with file extensions of .cs (C #file type) and .c (C file type), are more likely to have a higher weight or boost value for an API call than an HTML, document (.htm file extension) or text files (.doc file extension).

Referring to FIG. 3, a programmer may identify the various source code files to be used in the search which is input to the rank engine. The source code files can be identified through any means and are associated with the metadata that provides an index to the words used in the source code file. The terms of the search query are input to the rank engine in addition to the boost values for the code types and the file types. The rank engine then uses these inputs to compute the rank score for each source code file (block 302). In one aspect, the rank score for a source code file may be determined by iterating through each file for each occurrence of each term in the search query.

As shown in FIG. 3, the rank engine considers each term, one term at a time (block 304), through each file, one file at a time (block 306), and for each occurrence of the term (block 308). A custom score, Custom Score, is computed for each term as the sum of all the term scores, $\Sigma_{i=1}^{n}$ Term Score $(t_i)$ (block 310). A term score is calculated for each occurrence of the term when the used as a particular code type as the product of the number of occurrences of the term as that particular code type and the boost value for the code type, which is represented mathematically as: Term Score $(t_i)$= Boost value for code type i*(#of occurrences that term t occurs as code type i). The custom score is then boosted by the boost value for the file type resulting in the rank score for the particular file (block 312). This process is repeated for each file in which the term appears (blocks 304-block 312).

The rank engine then compares the rank score of each file (block 314). In the event there is a tie between the rank scores of two or more files (block 316—Yes), then a second factor is applied to each of the files that are tied as a tie breaker (block 318) and added to each of the files' current rank score resulting in a final rank score (block 320). In one aspect, the second factor or tie breaker may be a second ranking technique, such as the Term Frequency/Inverted-Document-Frequency (TF/IDF) ranking function. The TF/IDF score is the product of the TF score and the IDF score. The TF score is the ratio of the number of occurrences of a term in a file over the number of words in a file. The IDF score is the log of the ratio of the total number of documents over the number of documents with an occurrence of the term in it. In this aspect, the rank score for a file, with the tiebreaker, is represented mathematically as follows:

Rank Score=(Custom Score+Second Score)*Boost Value for the File Type, where the Custom Score=$\Sigma_{i=1}^{n}$ Term Score $(t_i)$,
Second Score=TF(t)*IDF(t),
t=term in the search query,
i=code type for term t,
n=number of code types for term t,
Term Score $(t_i)$=Boost value for code type i*(number of occurrences that term t occurs as code type i),
TF(t)=(number of occurrences of term t in the file)/ (total number of words in the document, IDF(t)=$\log_e$ (total number of documents searched)/ number of documents where term t occurs.

If there is no tie between the rank scores of any files (block 316—No), then the current rank score for the file is generated as the rank score for the file (block 320). Thereafter, the rank scores are used by the output engine to display the search results in an order of descending rank score.

It should be noted that in another aspect of the subject matter disclosed herein, the calculation of the rank score may include the second score even if there is no need for a tie breaker. In this aspect, the metadata for each file would also include the number of words in the file. The rank engine would compute the term frequency, TF(t), for term t, from the metadata. The rank engine would compute the IDF(t), for term t, by tracking the number of files searched and from the metadata of each searched file which includes the number of occurrences of the word or term in a source code file.

Attention now turns to FIG. 4 which illustrates an exemplary screenshot 400 of the output of the search results in an order of relevancy based on the rank scores. There is shown a window 402 having a first input box 404 for a user to indicate the type of files that are to be searched. In the first input box 404, the user has indicated "Code" or source code files. A second input box 406 is used by the user to indicate in which Projects the source code files are located. A Project is a grouping of files. In the second input box 406, the user has checked off "Roslyn" indicating the source code files of the Roslyn Project. A third input box 428 is used by the user to input the search query. In the third input box 428, the search query is shown to be the single term "Parser." Using these inputs, the search engine and rank engine search the source code files in the Roslyn Project for the term "Parser".

The ranked search results are shown in display box 410 where the four most relevant search results out of thirty-five results are displayed. Theses search results are listed in order of relevance based on a descending rank score, that is the search results from the file having the highest rank score is presented first, followed by the search results from each file having the next highest rank score. The first ranked search result 412 shows that there are five matches for the term "Parser" in the file Document.cs which is located in Project Roslyn in the folder \src\Compilers\Core\Portable\InternalUtilities 414. The second ranked search result 416 shows that there are thirty-four matches for the term "Parser" in the file SyntaxFactory.cs which is also located in Project Roslyn's folder \ src\Compilers\Core\Portable\Syntax\ 418. The third ranked search result 420 shows that there are eight matches for the term "Parser" in the file SyntaxHelpers.cs which is located in Project Roslyn's folder \src\ExpressionEvaluator\CSharp\Source\ 422. The fourth ranked search result 424 shows that there are five matches for the term "Parser" in the file CommandLineText.cs in the folder \src\Compilers\CSharp\Test\CommandLine\ 426.

The display box 430 shows a source code listing of the first search result, that being the file Document.cs, in which the search term "Parser" is located on line 512 in the source code statement "private static class Parser" 432.

In accordance with aspects of the subject matter described herein, a computer system can include one or more processors, a memory connected to one or more processors, a user interface, a search engine and an output engine. The user interface receives a search query that includes one or more terms that are to be matched in one or more source code files. The search engine searches for the occurrences of each term in a search query in the one or more source code files. Each occurrence of a term is tracked and associated with a code type that is based on the usage of that term in the matched occurrence relative to the syntax of the source code file, such as the grammar of the programming language of the source code file, in which the term was found. A rank score is determined for each file that is based on a number of the matched occurrences for each code type, a boost value for each code type of a matched occurrence, and a boost value for the file type of the source code file in which the term was found. The rank score may also include a second score which is based on a second ranking technique. This second score may be used in the rank score in the event two or more files have the same rank score. The output engine presents the search results in an order of descending rank score.

The system also includes a metadata generation engine that generates metadata for each of the searched source code files. The metadata may be part of the source code file or separate from the source code file. The metadata includes each word in the source code file, the location of each occurrence of each word, and the code type associated with each word.

A device can include at least one processor and a memory connected to the at least one processor. The processor is configured to search source code files that are associated with metadata, to process a search query and to output search results from the search based on a descending rank score order. The metadata includes each word in a source code file and the number of occurrences of a word when used as a particular code type. A code type represents a classification of a word based on a context of the word relative to a syntax of the source code file in which the word occurs.

The search query includes at least one term. Each source code file that is searched tracks the occurrence of each term as that word is used in a particular context or code type. A custom score is computed based on the tracked occurrences of the word in each code type with a boost value for the code type of a tracked occurrence. A final rank score is computed for each searched source code file using the custom score for each code type of a match in the file and a boost value for the file type of the file. The boost values for the code types may be based on a search objective and may be user-defined. The final rank score may incorporate a second score which is based on a frequency-based ranking technique. The search results are then output based on a descending final rank score. The search results may be output along with a listing of a source code file in which the term appears.

A method of using a system and device, such as the system and device described above, can include operations such as obtaining a search query to search source code files for one or more terms. The search includes computing a first score for each occurrence of a term that is based on the occurrence of a term when that term is found in a particular context or code type. A weight is applied to the first score that is based on a boost value for the code type. A rank score is then computed for each file based on each weighted first score and a boost value for the file type of the searched source code file. In the event two or more files have the same rank score, the rank score of each of these files is recomputed using a second rank score that is based on a second ranking technique, such as a term frequency ranking technique.

Metadata is generated for each of the searched source code files that includes each word in the source code file with each of its locations and associated code type. The boost values for the code types and the file types may be user-defined. The code types may include one or more of argument; basetype; caller; class; class declaration; class definition; comment; constructor; declaration; definition; destructor; enumerator; extern; field; friend; function; function declaration; function definition; global; header; interface; macro; macro definition; macro reference; method; method declaration; method definition; namespace; property; reference; string literal; struct; struct declaration; struct definition; template argument; template spec; type; typedef; and union.

Technical Effect

Aspects of the subject matter disclosed herein pertain to the technical problem of ranking search results in a more relevant and meaningful manner. The technical features associated with addressing this problem involve a ranking technique that considers the context in which a term in a search query is used in a source code file and the file type in which the term is found. Accordingly, aspects of the disclosure exhibit technical effects with respect to producing an ordering of the search results that ranks the more relevant results ahead of those of less relevance by considering the code type of a matched term, the file type containing the matched term, a boost value for the code type and a boost value for the file type.

Exemplary Operating Environments

Figure 5:
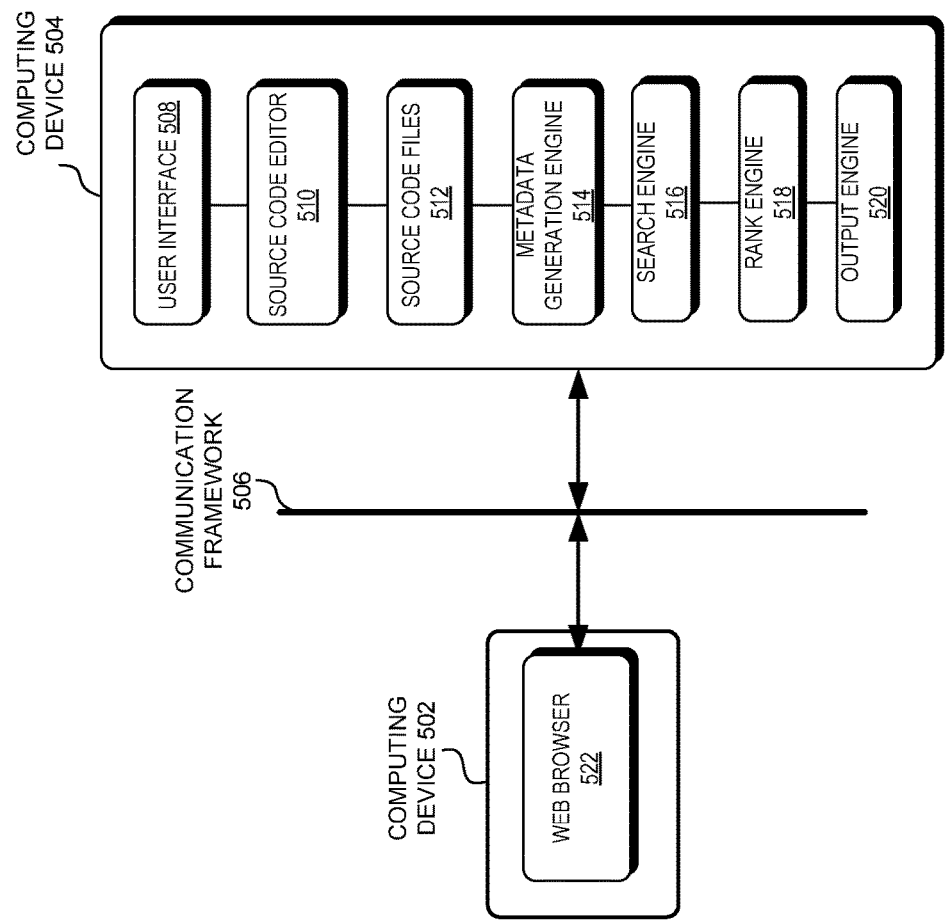
FIG. 5 is a block diagram illustrating a first exemplary computing or operating environment.

Attention now turns to a discussion of exemplary operating environments. FIG. 5 depicts a first exemplary operating environment 500 that includes two computing devices 502, 504 communicatively coupled to a communications framework 506. The computing devices 502, 504 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof.

The communication framework 506 facilitates communications between the computing devices 502, 504. The communications framework 506 may embody any well-known communication techniques, such as techniques suitable for use with packet-switched networks (e.g., public networks such as the Internet, private networks such as enterprise intranet, and so forth), circuit-switched networks (e.g., the public switched telephone network), or a combination of packet-switched networks and circuit-switched networks (with suitable gateways and translators).

In one aspect, the first computing device 502 may be used by a programmer to interact with a service provided on the second computing device 504. The service on the second computing device 504 is configured to provide the programmer with the components and facilities needed to search source code files of a source code repository and to rank the results in accordance with a rank score. The first computing device 502 may include a web browser 522 through which a programmer interacts with the service provided on the second computing device 504.

The second computing device 504 may include a user interface 508, source code files 512, a metadata generation engine 514, a search engine 516, a rank engine 518, and an output engine 520. The second computing device 504 may include other components, such as a source code editor 510, one or more compilers (not shown) and other components used to facilitate software development. Alternatively, the components of the second computing device 504 may be part of an integrated development environment (IDE) that provide a native code development environment or may provide a managed code development that runs on a language virtual machine or may provide a combination thereof.

Figure 6:
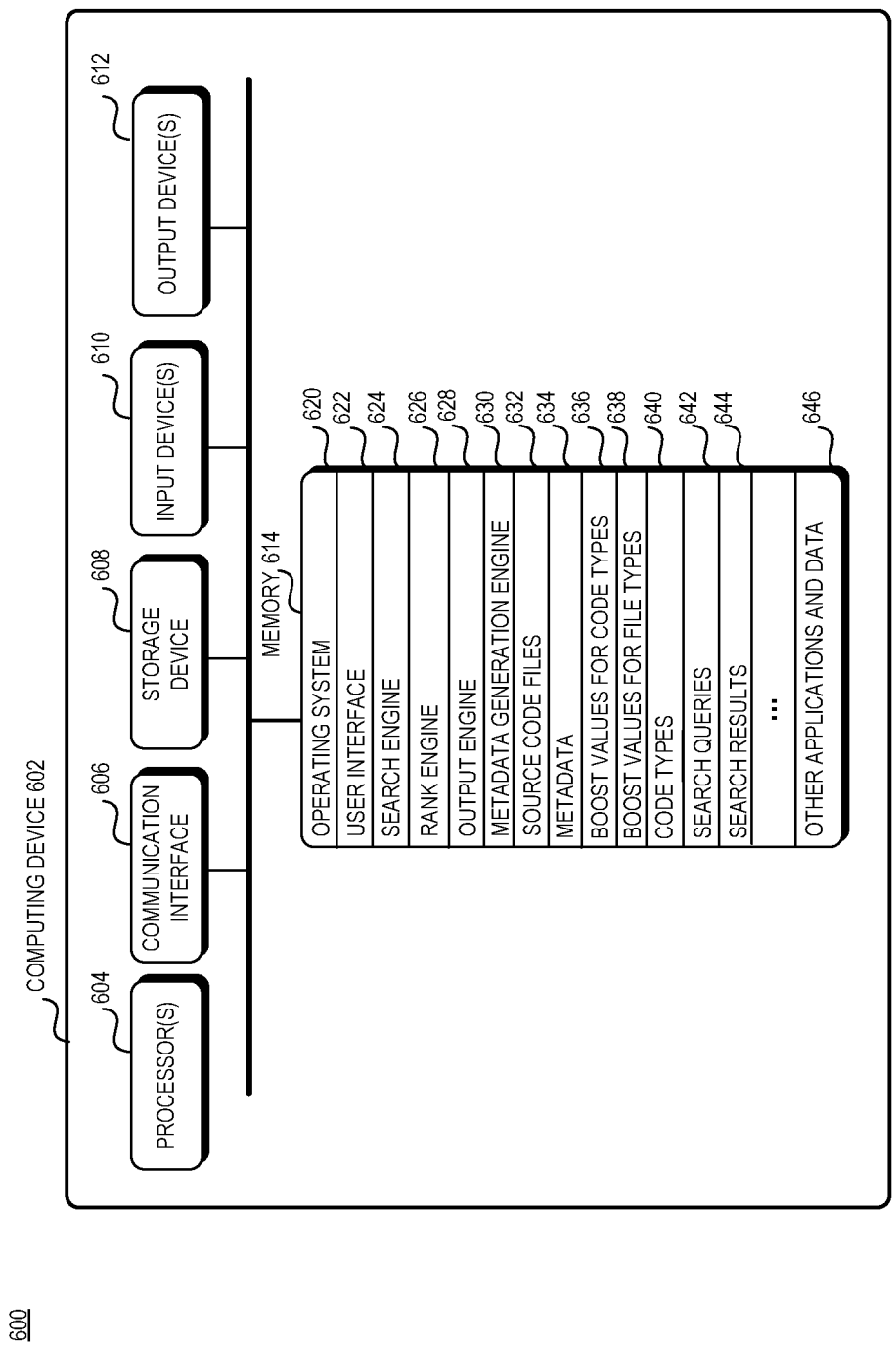
FIG. 6 is a block diagram illustrating a second exemplary computing or operating environment.

Attention now turns to FIG. 6 and a discussion of a second exemplary operating environment. It should be noted that the operating environment 600 is exemplary and is not intended to suggest any limitation as to the functionality of the embodiments. The embodiments may be applied to an operating environment 600 utilizing at least one computing device 602. The computing device 602 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 600 may be configured in a network environment, a distributed environment, a multi-processor environment, or a stand-alone computing device having access to remote or local storage devices.

The computing device 602 may include one or more processors 604, a communication interface 606, a storage device 608, one or more input devices 610, one or more output devices 612, and a memory 614. A processor 604 may be any commercially available processor and may include dual microprocessors and multi-processor architectures. The communication interface 606 facilitates wired or wireless communications between the computing device 602 and other devices. The storage device 608 may be computer-readable medium that does not contain propagating signals, such as modulated data signals transmitted through a carrier wave. Examples of the storage device 608 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 608 in the computing device 602. The input devices 610 may include a keyboard, mouse, pen, voice input device, touch input device, etc., and any combination thereof. The output devices 612 may include a display, speakers, printers, etc., and any combination thereof.

The memory 614 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. The memory 614 may also include one or more external storage devices or remotely located storage devices that do not pertain to propagated signals, such as modulated data signals transmitted through a carrier wave.

The memory 614 may contain instructions, components, and data. A component is a software program that performs a specific function and is otherwise known as a module, program, application, and the like. The memory 614 may include an operating system 620, a user interface 622, a search engine 624, a rank engine 626, an output engine 628, a metadata generation engine 630, source code files 632, metadata 634, boost values for the code types 636, boost values for the file types 638, code types 640, search queries 642, search results 644, and other applications and data 646.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, the subject matter has been described with respect to searching source code files. However, the ranking technique described herein is not limited to source code files and can be applied to other types of data files, such as text files, script files, and the like.

What is claimed:

1. A system, comprising:
at least one processor; and
at least one memory device communicatively coupled to the at least one processor;
wherein the memory includes instructions that when executed on the at least one processor perform actions that:
search a source code repository for one or more source code files having at least one term from a query, wherein each of the one or more source code files having a file type;
compute a rank score for each of the one or more source code files having the at least one term from the query, wherein the rank score is based on an accumulation of term scores for each term in the query, wherein the term score is based on a frequency of each term used in a particular code type;
compare the rank scores for each of the one or more source code files;
upon two or more source code files having a same rank score, apply a second score to the rank score of each of the two or more source code files, wherein the second score is based on a frequency of the at least one term relative to a number of words in a select one of the two or more source code files having the same rank score and based on a number of documents searched relative to a number of documents with an occurrence of the at least one term; and
rank search results for the query based on the rank scores.

2. The system of claim 1, wherein the memory includes instructions that when executed on the at least one processor perform actions that:
apply a boost value of the file type to the rank score for each of the two or more source code files having the same rank score.

3. The system of claim 1, wherein the memory includes instructions that when executed on the at least one processor perform actions that:
search metadata associated with each of the one or more source code files for the at least one term of the query, wherein the metadata includes the at least one term in the source code file and a usage frequency of the at least one term in a particular code type.

4. The system of claim 3, wherein the metadata includes a count of a number of lines of source code in the source code file.

5. The system of claim 1, wherein the memory includes instructions that when executed on the at least one processor perform actions that:
output the search results with a file name of each of the one or more source code files having the at least one term of the query and a number of matches of the at least one term in a corresponding code type.

6. The system of claim 1, wherein the search results include a location in each of the one or more source code files having the at least one term of the query.

7. The system of claim 1, wherein the search results include a partial source code listing of the at least one term in each of the one or more source code files.

8. A computer-implemented method, comprising:
  accessing a search query to search a plurality of source code files, the search query including at least one term;
  obtaining user-defined boost values for each of a plurality of code types used in the plurality of source code files;
  computing a rank score for each of the plurality of source code files having the at least one term, the rank score based on a term score for the at least one term found in the source code file in each code type, wherein each term score is boosted by the user-defined boost value for a corresponding code type;
  upon two or more source code files having a same rank score, recomputing the rank score by applying a second score to the rank score of the two or more source code files, wherein the second score is based on a frequency of the at least one term relative to a number of words in a select one of the two or more source code files having the same rank score and based on a number of documents searched relative to a number of documents with an occurrence of the at least one term; and
  rank search results for the query based on the revised rank scores.

9. The computer-implemented method of claim 8, further comprising:
  analyzing each word in each of the plurality of source code files;
  associating a code type with each word in each of the plurality of source code files; and
  tracking occurrences of each word in each of the plurality of source code files with a corresponding location and a corresponding code type.

10. The computer-implemented method of claim 9, further comprising:
  generating metadata for each of the plurality of source code files, the metadata including each occurrence of each word in a select one of the plurality of source code files, the corresponding location and the corresponding code type.

11. The computer-implemented method of claim 10, further comprising:
  extracting data for the rank score from the metadata of each of the plurality of source code files.

12. A computer-implemented method, comprising:
  obtaining a plurality of boost values for a plurality of code types;
  receiving a search query having at least one term;
  searching metadata associated with each of a plurality of source code files for the at least one term, wherein the metadata includes each word in a source code file, a location of each word in the source code file and usage of the word as a code type in a location in the source code file;
  computing a custom score for each of the plurality of source code files having the at least one term, wherein the custom score is based on a frequency of the at least one term used in a particular code type;
  generating a rank score by adding a term frequency (TF) and inverted-document-frequency (IDF) score to the custom score to each of the plurality of source code files having the at least one term, wherein the TF score is based on a number of occurrences of the at least one term over a number of words in a source code file where the at least one term occurs, wherein the IDF score is based on a ratio of a total number of source code files searched over a number of source code files having the at least one term; and
  ranking each of the plurality of source code files having the at least one term based on the rank scores.

13. The computer-implemented method of claim 12, further comprising:
  applying a boost value for each code type to the custom score.

14. The computer-implemented method of claim 12, further comprising:
  applying a boost value of the file type to the rank score.

* * * * *